J. GOODRUM.
COTTON CHOPPER ATTACHMENT FOR CULTIVATORS.
APPLICATION FILED FEB. 4, 1914.
1,115,425.
Patented Oct. 27, 1914.
3 SHEETS—SHEET 1.
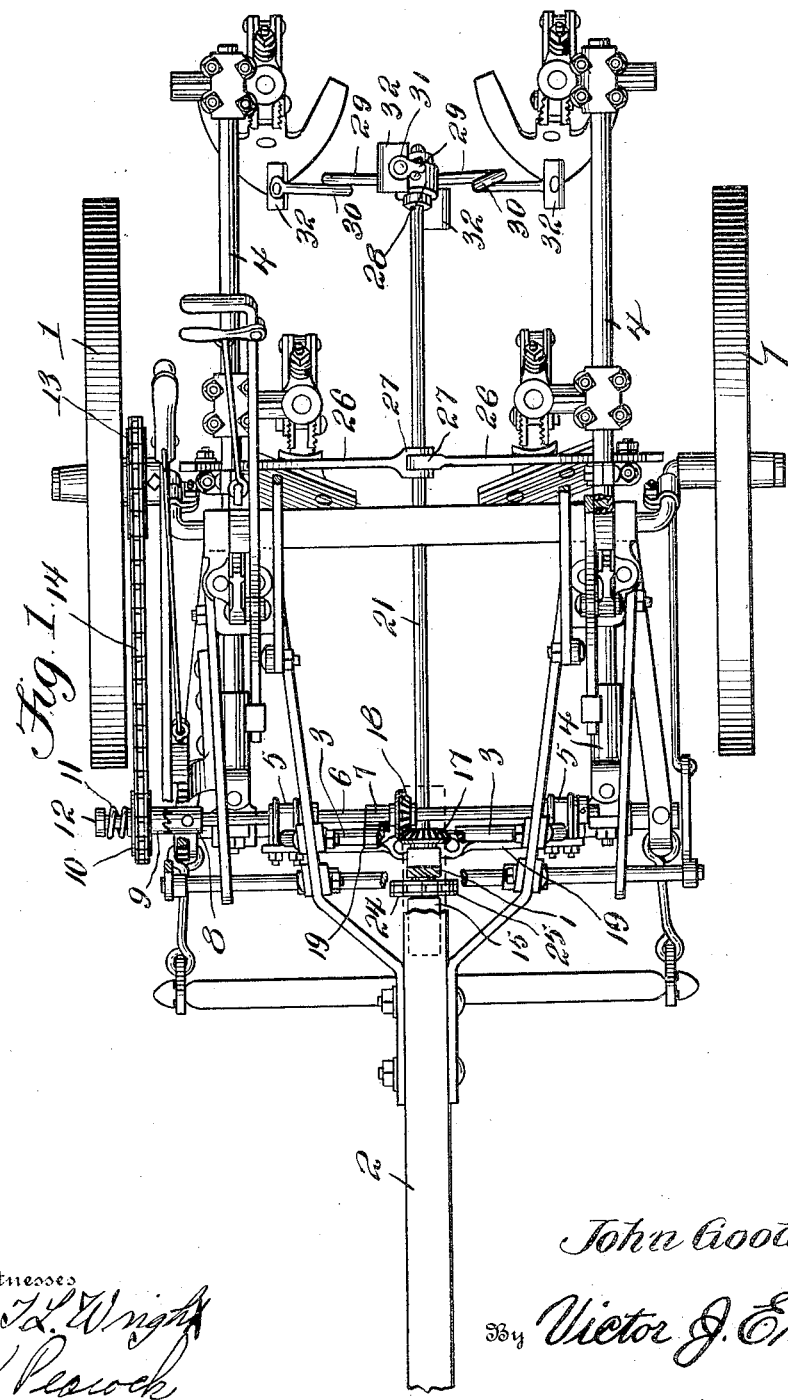
Inventor
John Goodrum
By Victor J. Evans
Attorney
Witnesses

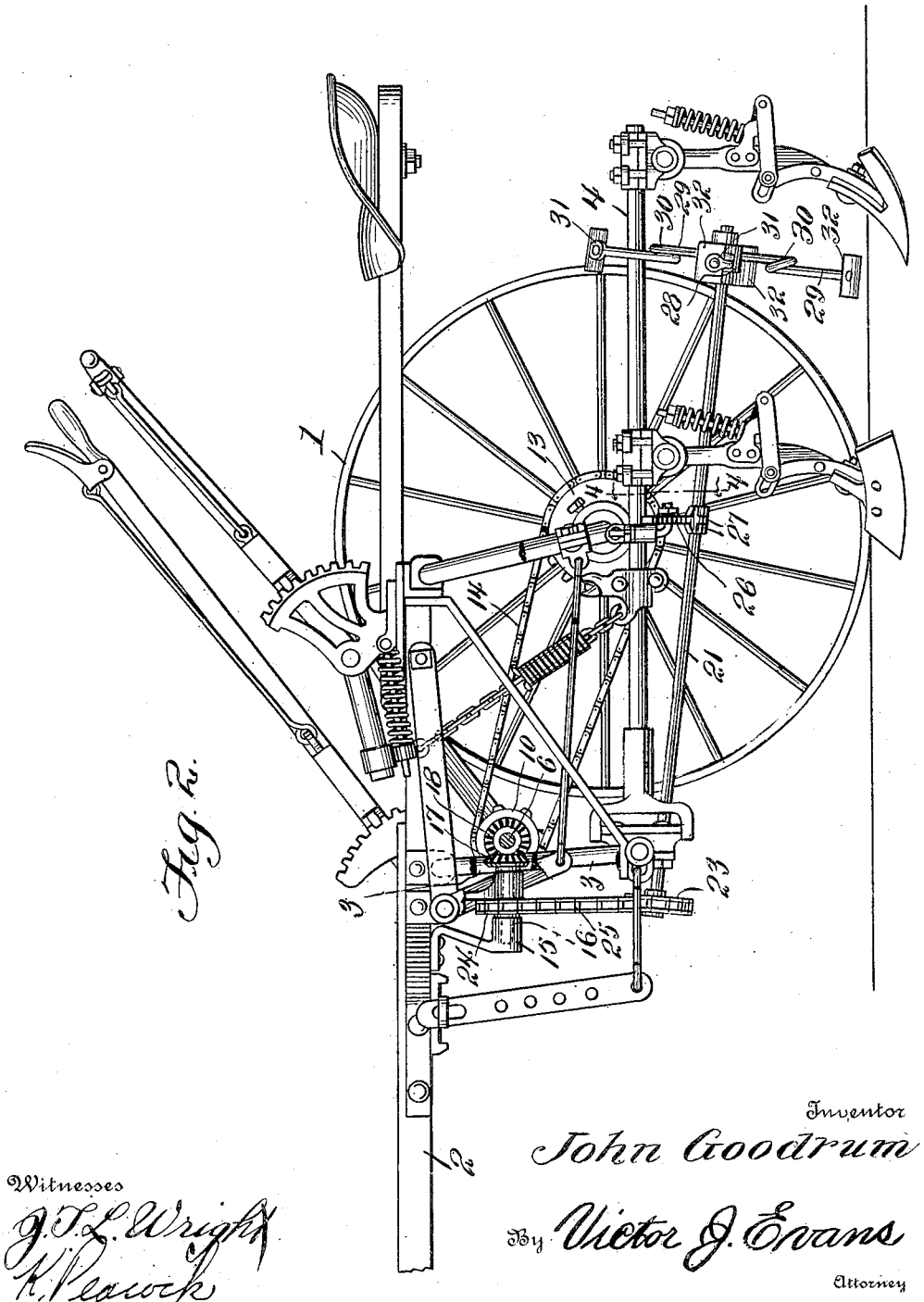

J. GOODRUM.
COTTON CHOPPER ATTACHMENT FOR CULTIVATORS.
APPLICATION FILED FEB. 4, 1914.
1,115,425.
Patented Oct. 27, 1914.
3 SHEETS—SHEET 3.
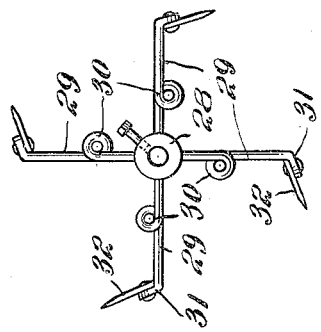
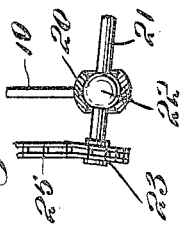
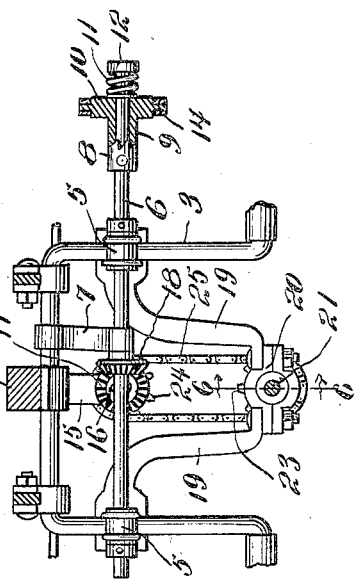
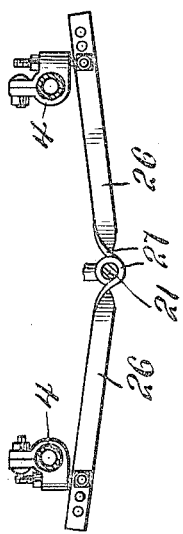
Witnesses
J. L. Wright
K. Peacock
Inventor
John Goodrum
By Victor J. Evans
Attorney

UNITED STATES PATENT OFFICE.

JOHN GOODRUM, OF GORE, GEORGIA.

COTTON-CHOPPER ATTACHMENT FOR CULTIVATORS.

1,115,425.  Specification of Letters Patent.  Patented Oct. 27, 1914.

Application filed February 4, 1914. Serial No. 816,447.

*To all whom it may concern:*

Be it known that I, JOHN GOODRUM, a citizen of the United States, residing at Gore, in the county of Chattooga and State of Georgia, have invented new and useful Improvements in Cotton-Chopper Attachments for Cultivators, of which the following is a specification.

This invention has relation to cotton chopper attachments especially adapted to be applied to the frames of cultivators and it consists in the novel features hereinafter described and claimed.

An object of the invention is to provide an attachment of the character indicated which is of simple structural arrangement and which when in position upon the cultivator may be readily guided or directed during the chopping operation.

With the above object in view the attachment comprises a shaft adapted to be journaled at the forward portion of the cultivator together with means for rotating the said shaft from one of the supporting wheels of the cultivator. A shaft is journaled at the lower portion of the frame of the cultivator and extends approximately parallel with the cultivator beams. Means is provided for supporting the rear portion of the last mentioned shaft from the cultivator beams and the last mentioned shaft carries chopping hoes or blades. Means is provided for rotating the second mentioned shaft from the first mentioned shaft.

In the accompanying drawing:—Figure 1 is a top plan view of a cultivator with the chopper applied. Fig. 2 is a side elevation of the same. Figs. 3, 4, 5 and 6 are detailed views of the several features of the chopper.

The cultivator to which the chopper attachment may be applied is of any conventional form and includes supporting wheels, 1, a tongue 2, an arch bar 3 and beams 4 which are pivotally connected with the end portions of the arch bar in any desired manner.

The chopper comprises bearings 5 which are adapted to be secured to the side portions of the arch bar 3 and a shaft 6 is journaled for rotation in the said bearings. A brace 7 extends from the intermediate portion of the arch bar 3 to the intermediate portion of the shaft 6 and serves to maintain the intermediate portion of the said shaft in proper alinement with the said bearings. A clutch member 8 is fixed to the shaft 6 and a clutch member 9 is slidably mounted upon the said shaft. The clutch member 9 carries a sprocket wheel 10 and a spring 11 bears at one end against the side of the sprocket wheel 10 and at its other end against a stop 12 fixed to the end portion of the shaft 6. The spring 11 is under tension with a tendency to hold the clutch member 9 in engagement with the clutch member 8. A sprocket wheel 13 is mounted for rotation in unison with one of the supporting wheels 1 and a sprocket chain 14 is trained around the sprocket wheels 13 and 10. Therefore it will be seen that as the supporting wheel 1 to which the sprocket wheel 13 is attached is rotated rotary movement is transmitted through the chain 14 to the wheel 10 and when the clutch member 9 is in engagement with the clutch member 8 the shaft 6 is rotated. The engaging adjacent ends of the clutch members 8 and 9 are so disposed that the clutch member 9 may move in a rearward direction without turning the clutch member 8 but as soon as the clutch member 9 rotates in a forward direction the clutch member 8 is engaged whereby the shaft 6 is rotated. Therefore in backing the cultivator or in turning it around should the clutch member 9 rotate rearwardly the shaft 6 is not turned but as soon as the cultivator moves in a forward direction the shaft 6 automatically begins to turn.

A bracket 15 is carried under the rear portion of the tongue 2 and a stub shaft 16 is journaled for rotation in the said brackets. The stub shaft 16 carries at its rear end a beveled gear wheel 17 which meshes with a beveled gear wheel 18 mounted upon the shaft 6. Therefore it will be seen that as the shaft 6 rotates rotary movement is transmitted to the meshing gear wheels 17 and 18 to the stub shaft 16.

Hangers 19 are secured at their upper ends to the side portions of the arch bar 3 and the said hangers support at their lower ends the members of a globular bearing 20. A shaft 21 is provided with a ball 22 which is journaled in the globular bearing 20 and while the shaft 21 is free to swing with relation to the bearing 20 the said ball prevents the said shaft from moving longitudinally through the said bearings. A sprocket wheel 23 is carried at the forward end of the shaft 21 and a sprocket wheel 24 is fixed to the intermediate portion of the stub shaft 16. A sprocket chain 25 is trained around the sprockets 23 and 24 and is adapted to transmit rotary movement from the stub shaft 16 to the shaft 21. Arms 26 are pivotally and adjustably connected with the intermediate portions of the beams 4 and the inner ends of the said arms 26 are provided with bearings 27 which receive the intermediate portion of the shaft 21. The arms 26 are so disposed that the shaft 21 is at all times approximately maintained midway between the beams 4. Consequently as the beams are swung upon their pivotal connections with the arch bar 3 the shaft 21 is moved correspondingly. Inasmuch as the shaft 21 may have limited universal movement with relation to the bearing 20 by reason of the ball 22 located in the bearing 20 the rear end of the shaft 21 may rise and fall with the rear end portions of the beams 4 as the said beams move over uneven places at the surface of the soil.

A head 28 is fixed to the rear portion of the shaft 21 and carries a series of resilient arms 29. These arms are disposed approximately radially upon the periphery of the head 28 and each arm is provided at a point between its ends with a coil 30 which adds to the resiliency of the arm. Each arm is provided at its outer end with an angularly disposed extremity 31 and a chopping blade 32 is mounted upon each extremity 31. Therefore it will be seen that as the cultivator moves over the ground the shaft 21 is rotated and the head 28 is carried around with the said shaft. As the blades 32 carried by the arms 29 come successively in contact with the surface of the soil the superfluous plants in the row of plants are chopped out and those plants which pass through the intervals between the arms 29 are permitted to remain standing in the row. Thus the plants are thinned and the cultivator shovels which are carried by the beams 4 properly cultivate or pass the soil toward the plants which are left standing in the row.

The beams 4 may be supplied with any kind of cultivating blades. The forward blades may be used for removing the soil from the opposite side of the row of plants and after this has been done the blades 32 will remove the superfluous plants from the row and the blades which are located at the rear portions of the beams 4 will cast the soil back toward the roots or plants which are left standing in the row.

Having described the invention what is claimed is:—

1. In combination with a wheel mounted frame having swinging members a cotton chopper comprising a shaft journaled upon the frame, means for rotating the shaft from one of the supporting wheels of the frame, a stub shaft journaled upon the frame and operatively connected with the first mentioned shaft, a shaft journaled for rotation below the frame, means for rotating the last mentioned shaft from the stub shaft, chopping elements carried by the last mentioned shaft, and arms adapted to be pivotally connected with the swinging members of the frame and having bearings which receive the intermediate portion of the last mentioned shaft.

2. In combination with a wheel mounted frame, having beams pivotally connected thereto, a shaft journaled transversely of the frame, a clutch member fixed to the shaft, a spring clutch member slidably mounted upon the shaft and adapted to engage the first mentioned clutch member, means for rotating the last mentioned clutch member from one of the supporting wheels of the frame, a stub shaft journaled upon the frame, means operatively connecting the stub shaft with the first mentioned shaft, a globular bearing supported upon the frame, a shaft passing through said bearing and having a ball which is received in the said bearing, means for operating the last mentioned shaft from the stub shaft, chopping elements carried by the last mentioned shaft, arms adapted to be pivotally connected with the beams of the frame and bearings carried by the said arms and receiving the intermediate portion of the last mentioned shaft.

In testimony whereof I affix my signature in presence of two witnesses.

JOHN GOODRUM.

Witnesses:
S. B. HENLEY,
GORDON ALLEN.

---

Copies of this patent may be obtained for five cents each, by addressing the "Commissioner of Patents, Washington, D. C."